United States Patent Office 3,679,540
Patented July 25, 1972

3,679,540
REINFORCED MICROPOROUS FILM
Daniel Zimmerman, Brunswick, and Stanley Wolfowitz, Union, N.J., assignors to Celanese Corporation, New York, N.Y.
No Drawing. Filed Nov. 27, 1970, Ser. No. 93,514
Int. Cl. B32b 7/00
U.S. Cl. 161—159                    6 Claims

ABSTRACT OF THE DISCLOSURE

Microporous films exhibit many properties which are beneficial in specialized end uses, however, because of the microporous characteristics, the film inherently suffers from poor strength. By reinforcing the microporous films with a macroporous substrate the strength problems have been overcome while maintaining the desirable permeability and accordingly, the reinforced films may now be used in sterile packaging and as hospital bed sheets, pillow liners and the like.

INVENTION

This invention relates to a method for improving the strength properties of microporous films while maintaining the desired permeability qualities of said film and the resulting product.

Microporous films of the type described in copending U.S. application Ser. No. 835,367 filed on June 23, 1969, now Pat. 3,558,764 and copending U.S. application Ser. No. 876,511 filed on Nov. 13, 1969 now abandoned are particularly useful in breathable medical dressings such as disclosed in U.S. Pat. 3,426,754, issued on Feb. 11, 1969.

However, because of the inherent weakness of the microporous film, such uses as sterile packaging, hospital linens and the like have been an end use which has been outside the practicality of the above-mentioned film.

Applicants by means of this invention have developed a technique for rendering the inherently weak microporous film substantially stronger while maintaining its desirable high level of permeability and accordingly, the films are now useable in various end uses which have heretofore been impractical.

Porous or cellular films can be classified into two general types: one type in which the pores are not interconnected, i.e., a closed-cell film, and the other type in which the pores are essentially interconnected through tortuous paths which may extend from one exterior surface or surface region to another i.e., an open-celled film. The porous films of the present invention are of the latter type.

Further, the porous films of the present invention are microscopic, i.e., the details of their pore configuration or arrangement are discernible only by microscopic examination. In fact, the open cells or pores in the films are smaller than those which can be measured using an ordinary light microscope, because the wavelength of visible light, which is about 5,000 angstroms (an angstrom is one ten-billionth of a meter), is longer than the longest planar or surface dimension of the open cell or pore. The microporous films of the present invention may be identified, however, by using electron microscopy techniques which are capable of resolving details of pore structure below 5,000 angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the Encyclopedia of Chemical Technology, vol. 4, p. 892 (Interscience, 1949).

Porous films have been produced which possess a microporous, open-celled structure, and which are also characterized by a reduced bulk density. Films possessing this microporous structure are described, for example, in U.S. Pat. 3,426,754, which patent is assigned to the assignee of the present invention. The preferred method of preparation described therein involves drawing or stretching at ambient temperatures, i.e., "cold drawing," a crystalline, elastic starting film in an amount of about 10 to 300 percent of its original length, with subsequent stabilization by heat setting of the drawn film under a tension such that the film is not free to shrink or can shrink only to a limited extent.

While the above described microporous or void-containing film of the prior art is useful in this invention the search has continued for new processes able to produce open-celled microporous films having a greater number of pores, a more uniform pore concentration or distribution, a larger total pore area, and better thermal stability of the porous or voidy film. These properties are significant in applications such as filter media where a large number of uniformly distributed pores are necessary or highly desirable; and in applications such as breathable medical dressings subject to high temperatures, e.g., sterilization temperatures, where thermal stability is necessary or highly desirable. It is submitted that the process disclosed in U.S. Pat. 3,426,754 and the improvement thereof, hereinafter defined in detail, are equally capable of producing a microporous product which may be subsequently strengthened as hereinafter indicated.

An improved process for preparing open-celled microporous polymer films from non-porous, crystalline, elastic polymer starting films, includes (1) cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat setting the resulting porous film under tension, i.e., at substantially constant length, to impart stability to the film.

The elastic starting film is preferably made from crystalline polymers such as polypropylene by melt extruding the polymer into a film, taking up the extrudate at a drawdown ratio giving an oriented film, and thereafter heating or annealing the oriented film if necessary to improve or enhance the initial crystallinity.

The essence of the improved process is the discovery that the sequential cold stretching and hot stretching steps impart to the elastic film a unique open-celled structure which results in advantageous properties, including improved porosity, improved thermal stability and a gain or enhancement of porosity when treated with certain organic liquids such as perchloroethylene.

As determined by various morphological techniques or tests such as electron microscopy, the microporous films of the improved process are characterized by a plurality of elongated, non-porous, interconnecting surface regions or areas which have their axis of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the films utilized by the present invention. These surface pores or open cells are substantially interconnected through tortuous paths or passageways which extend from one surface region to another surface area or region.

With such a defined or organized morphological structure, the films of the present invention may have a greater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

In fact the total surface area per cubic centimeter of material of the films of this invention have a range of from 2 to about 200 square meters per cc. Preferably the range is from about 5 to about 100 square meters per cc. and most preferably from about 10 to about 80 square meters per cc. These values can be compared with normal pin-punched film which has a total surface area per gram of about 0.1 square meter; paper and fabric which have values per gram of about 1.0 square meter and leather which has a value of about 1.6 square meters per cc. Additionally the volume of space per volume of material range from about 0.05 to about 1.5 cubic centimeters per gram, preferably from about 0.1 to about 1.0 cubic centimeter per gram and most preferably from 0.2 to about 0.85 cubic centimeter per gram. Additional data to define the films of this invention relates to nitrogen flux measurements, wherein the microporous films have Q (or nitrogen) flux values in the range of from about 5 to 400 preferably about 50 to 300. These values give an indication of porosity, with higher nitrogen flux values indicating higher levels or porosity.

Nitrogen flux may be calculated by mounting a film having a standard surface area of 6.5 square centimeters in a standard membrane cell having a standard volume of 63 cubic centimeters. The cell is pressurized to a standard differential pressure (the pressure drop across the film) of 200 pounds per square inch with nitrogen. The supply of nitrogen is then closed off and the time required for the pressure to drop to a final differential pressure of 150 pounds per square inch as the nitrogen permeates through the film is measured with a stop watch. The nitrogen flux, Q, in gram moles per square centimeter minute, is then determined from the equation:

$$Q = \frac{27.74 \times 10^3}{\Delta t \times T}$$

where $\Delta t$ is the change in time measured in seconds and T is the temperature of nitrogen in degrees Kelvin. The above equation is derivated from the gas law, $PV = ZnRT$.

The microporous films of the present invention are formed from a starting elastic film of crystalline, film-forming, polymers. These elastic films have an elastic recovery at zero recovery time (hereinafter defined) when subjected to a standard strain (extension) of 50 percent at 25° C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows:

Elastic recovery (ER), percent $$= \frac{\left(\begin{array}{c}\text{length} \\ \text{when stretched}\end{array}\right) - \left(\begin{array}{c}\text{length} \\ \text{after stretching}\end{array}\right)}{\text{length added when stretched}} \times 100$$

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent and most preferably at least 50 percent, e.g., about 50 to 90 percent, or more. Percent crystallinity is determined by the X-ray method described by R. G. Quynn et al. in the Journal of Applied Polymer Science, vol. 2, No. 5, pp. 166–173 (1959). For a detailed discussion of crystallinity and its significance in polymers, see Polymers and Resins, Golding (D. Van Norstrand, 1959).

Preferred suitable starting elastic films, as well as the preparation thereof, are further defined in British Pat. No. 1,198,695, published July 15, 1970. Other elastic films which may be suitable for the practice of the present invention are described in British Pat. No. 1,052,550, published Dec. 21, 1966 and are well known in the art.

The starting elastic film utilized in the preparation of the microporous films of the present invention should be differeneiated from films formed from classical elastomers such as the natural and synthetic rubbers. With such classical elastomers the stress-strain behavior, and particularly the stress-temperature realtionship, is governed by entropymechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coeffcient) may be interpreted to mean that the elasticity of these materials is not governed by entropy effects but dependent upon an energy term. More significantly, the starting elastic films have been found to retain their stretch properties at temperatures where normal entropyelasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copoymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene or other relatively long chain alkenes, as well as copolymers of 3-methyl pentene-1 and any of the same n-alkenes mentioned previously in connection with 3-methyl butene-1. These polymers in the form of film should generally have a percent crystallinity of at least 20 percent, preferably at least 30 percent, and most preferably about 50 percent to 90 percent or higher.

For example, a film-forming homopolymer of polypropylene may be employed. When propylene homopolymers are contemplated, it is preferred to employ an isotactic polypropylene having a percent crystallinity as indicated above, a weight average molecular weight ranging to 500,000 and a melt index (ASTM-1958D-1238-57T, part 9, p. 38) from about 0.1 to about 75, preferably about 0.5 to 30, so as to give a final film products having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, one which contains recurring oxymethylene, i.e., —CH$_2$—O—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150° C., and a number average molecular weight of at least 10,000. For a more detailed discussion of acetal and oxymethylene polymers, see Formaldehyde, Walker, pp. 175–191 (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as from about 100,000 to 750,000 preferably about 200,000 polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or states may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply "draw ratio," as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C., preferably 200° C. to 240° C. Polyethylene may be extruded at a melt temperature of about 175° C. to 225° C., while acetal polymers, e.g., those of the type disclosed in U.S. Pat. 3,027,352 may be extruded at a melt temperature of about 185° C. to 235° C., preferably 195° C. to 215° C.

The extrusion operation is preferably carried out with rapid cooling and rapid drawdown in order to obtain maximum elasticity. This may be accomplished by having the take-up roll relatively close to the extrusion slot, e.g., within two inches, and preferably, within one inch. An "air knife" operating at temperatures between, for example 0° C. and 40° C., may be employed within one inch of the slot to quench, i.e., quickly cool and solidify the film. The take-up roll may be rotated, for example, at a speed of 10 to 100 ft./min., preferably 50 to 500 ft./min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of the extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_2/D_1$ ratio, for example, 0.5 to 6.0 and preferably about 1.0 to about 2.5, and the take-up speed, for example, 30 to 700 ft./min. The melt temperature may be within the ranges given previously for straight slot extrusion.

The extruded film may then be initially heat treated or annealed in order to improve crystal structure, e.g., by increasing the size of the crystallites and removing imperfections therein.

The resulting partly-crystalline film is then preferably subject to a process generally comprising the consecutive steps of cold stretching, hot stretching and heat setting. Of course, less preferable variations on this process (such as the elimination of the hot stretching step) can be carried out resulting in microporous films which, although inferior to those films made by the cold stretch-hot stretch-heat set process, still find utility as the microporous films of this invention.

The term "cold stretching" as used herein is defined as stretching or drawing a film to greater than its original length and at a stretching temperature, i.e. the temperature of the film being stretched, less than the temperature at which the melting of the film begins when the film is uniformly heated from a temperature of 25° C. at a rate of 20° C. per minute. The term "hot stretching" as used herein is defined as stretching above the temperature at which melting begins when the film is heated from a temperature of 25° C. at a rate of 20° C. per minute, but below the normal melting point of the polymer, i.e., below the temperature at which fusion occurs. For example, using polypropylene elastic film, cold stretching is carried out preferably below about 120° C. while hot stretching is carried out about this temperature.

The heat setting step in the preferred process for preparing the microporous films useful herein follows the cold stretching-heat stretching steps and is carried out at from about 125° C. up to less than the fusion temperature of the film in question. For polypropylene the range preferably is about 130° C. to about 160° C.

The resulting microporous film exhibits a final crystallinity of preferably at least 30 percent, more preferably about 50 to 100 percent as determined by the aforementioned X-ray method. Furthermore, this film exhibits an average pore size of about 100 to 5000 angstroms more usually 150 to 3000 angstroms the values being determined by mercury porosimetry as described in an article by R. G. Quynn, on pp. 21–34 of Textile Research Journal, January 1963.

As hereinabove indicated the subject invention relates to the use of a macroporous substrate applied to a base microporous film so as to increase its strength while maintaining its permeability.

By the term macroporous substrate, is meant to include plastic films, non-wovens and woven materials having an average pore size of at least about 5 microns (50,000 angstroms), preferably about 50 microns and most preferably about 75 microns and higher. The macroporous substrate must have some porosity otherwise the basic permeability characteristics of the microporous film would be obviated. Preferably the macroporous substrate, or reinforcing backing, should have from about 1 percent to about 50 percent open area and most preferred should have from about 5 percent to about 25 percent open area. The open area or macropores may be achieved by any means known in the art such as those to produce non-wovens and woven materials, however, the most convenient technique is to use a simple pin punch, preferably on a plastic film. Higher percentages of open area may be employed, however, when greater than 50 percent open area is used the strength of the film falls off at a fast rate and the purpose of this invention would be negated.

The surprising feature of the subject invention is that by applying the macorporous substrate not only is the inherent strength of the reinforced structure greater than the strength of the microporous film which would be expected, but, as is hereinafter demonstrated in the examples, the high permeability characteristics of the microporous film are maintained. This is surprising in view of the fact that one would expect, for instance, a macroporous substrate with only 20 percent open area would effectively reduce the permeability characteristics of the basic film by 80 percent (as there is 80 percent non-permeable film as a backing), but such is not the case.

The macroporous substrate may be applied to the base microporous film by any means well known in the art. A thin coating of pressure sensitive adhesive may be applied to the microporous film and subsequently contacted with the macroporous substrate. Great care, however, should be exercised when this method is employed, as too thick of a coating of adhesive will cover the microporous and at least partially, negate the main purpose of the microporous film (e.g., permeability). In this regard, it has been found that where pressure sensitive adhesives are employed, it is best to employ the technique of spraying the adhesive onto the microporous substrate so as to insure a relatively thin film. Other techniques may be employed such as coating a solvent treated adhesive onto either the microporous film or the non-stretched precursor film, which in the latter case is subsequently stretched so as to form a microporous structure as hereinbefore defined and thereafter heated to drive off the residual solvent and bonding the macroporous film thereto.

In another general area for forming laminates the use of an embossing roll will accomplish the same end result without the presence of an adhesive. In some end uses, such as surgical applications, embossing technique is the preferred method for forming the laminate, for the reason just stated, namely to eliminate the unnecessary inclusion of unwanted chemicals that could cause irritation to the human skin. For this reason, embossing is the preferred method for forming the laminates of this invention, and is the method described in the examples.

In the embossing method, however, since heat is employed, a further restriction must be placed upon the physical properties of the macroporous substrate. If the macroporous substrate had a higher softening temperature than the microporous substrate, the micropores would disappear before any bonding took place. Accordingly, if the embossing technique is employed to unite the two substrates, the macroporous substrate should have a softening temperature similar, but not greater than, the softening temperature of the microporous substrate. Preferably when the embossing technique is employed, the softening temperature of the macroporous substrate should not exceed about 160° C. Of course, it is understood that if, for instance, the microporous film has a softening temperature of about 125° C., this would be the upper limit for any macroporous substrate if the embossing technique were employed. Furthermore, it is clear that the heat of the embossing roll should not exceed and preferably in fact should be about 5° C. lower than the softening temperature of either the macroporous substrate polymer or the microporous substrate polymer.

The following examples are illustrative of the present invention and are not intended to limit the same in any manner.

EXAMPLES I–VI

Microporous polypropylene film having a total surface area of 80 square meters per cc., a volume of space per weight of material of 0.5 cubic centimeter per gram and a Q flux value of 113 was contacted with polypropylene film which had been pin punched with holes 0.045 inch in diameter with a metal die punch spiked roller. The microporous polypropylene film and the pin punched polyproplene film were then put through an embossing roll revolving at 8 revolutions per minute at 80° C. and a pressure of 250 pounds per square inch. The physical properties of the resultant product is compared with the above described microporous polypropylene film with no macroporous backing in Table I.

TABLE I

| Example | Percent open area on pin punched film | Permeability[1] Gurley | MVTR[2] | Tear,[3] M.D. | Elmendorf,[4] M.D. | Mulen[5] burst |
|---|---|---|---|---|---|---|
| Base microporous polypropylene film standard | | 30 | 1,700 | 1.2 | 2 | 16 |
| I | [6]36 | 42 | 1,540 | 1.8 | 42 | 33 |
| II | [7]27 | 43 | 1,240 | 2.0 | 55 | 36 |
| III | 0 | (a) | | 2.1 | | |
| IV | [8]9.5 | 47 | | 1.8 | | |
| V | [9]18 | 41 | | 1.5 | | |
| VI | [10]1 | 80 | 730 | 1.4 | | |

[1] Measured in seconds (10) per cubic centimeter per ASTM D-7265A.
[2] Measured in grams per 24 hours square meters per ASTM E-96-66.
[3] Measured in pounds per ASTM D-1004-61.
[4] Measured in grams per ASTM D-1922-67.
[5] Measured in pints per ASTM D-774-63.
[6] 36 percent open area contains 225 holes per square inch.
[7] 27 percent open area contains 168 holes per square inch.
[8] 9.5 percent open area contains 60 holes per square inch.
[9] 18 percent open area contains 112 holes per square inch.
[10] 1 percent open area contains 7 holes per square inch.
a Not permeable.

EXAMPLE VII

The microporous polypropylene film employed in Examples I to VI was contacted with a Kimton-Kendall rayon non-woven. The microporous film and the nonwoven were laminated by means of a vinyl acetate-maleate adhesive emulsion containing fifty-six weight percent solids. The resulting laminated exhibited a Gurley reading of 45 seconds per 10 cubic centimeters and a moisture vapor transmission reading of 1350 grams per 24 hours square meters.

EXAMPLE VIII

The microporous polypropylene film employed in Examples I to VII was contacted with a Texwipe woven cotton cloth (available from the Texwipe Company's Hillsdale, N.J.). The microporous film and the woven material were laminated by means of a vinyl acetate-maleate adhesive emulsion containing fifty-six weight percent solids. The resulting laminate exhibited a Gurley reading of 80 seconds per 10 cubic centimeters and a moisture vapor transmission reading of 730 grams per 24 hours square meters.

In like manner other plastics of similar softening temperature as the microporous polypropylene were utilized employing the embossing technique (e.g. polyethylene and ethylene/vinyl acetate) with equally good results. The beneficial results were greatly diluted when a polymer of vastly dissimilar softening temperature was employed (e.g. polyethylene terephthalate). This relatively inferior result can be obviated in either of two manners. Initially, a microporous polyethylene terephthalate film can be embossed to a macroporous polyethylene terephthalate film with enhanced results. Secondly a base polypropylene microporous film may be laminated to a macroporous polyethylene terephthalate film, however, the laminate should be achieved by means of an adhesive rather than an embossing technique. To further demonstrate the scope of their invention, other microporous base films were employed (e.g. polyethylene and polyacetal) which exhibited equally beneficial results.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. A reinforced structure comprising:
   (A) a layer of a microporous polymer film having a reduced bulk density as compared to the bulk density of corresponding polymer films having no open-celled structure, a surface area of from 2 to about 200 square meters per cc., and a crystallinity above about 30 percent, the film further being characterized by;
   (1) a plurality of interconnecting non-porous surface regions wherein said non-porous surface regions are elongated and substantially parallel;
   (2) a plurality of porous surface regions which include a plurality of fibrils with the porous surface regions being defined by the non-porous surface regions wherein said fibrils;
      (a) are randomly disposed throughout the entire porous region and are substantially parallel to each other and parallel to the direction of orientation;
      (b) define pore spaces of about 100 to 5000 angstroms;
      (c) define a multitude of pore spaces connected to each other so as to form tortuous paths interconnecting the two surfaces of said microporous polymer film said porous surface regions and said non-porous surface regions substantially alternating so as to produce a microporous film having a porosity volume of from about 0.05 to about 1.50 cubic centimeters per gram and a nitrogen Q flux value of 5 to about 400;
   (B) a layer of a macroporous thermoplastic film having an average pore size of at least 5 microns and a total open area based upon the entire macroporous film of from about 1 percent to about 50 percent.

2. The reinforced structure of claim 1 wherein the macroporous thermoplastic film has a softening temperature substantially similar to the softening temperature of the microporous polymer film.

3. The reinforced structure of claim 1 wherein said macroporous thermoplastic film is a pin punched film.

4. The reinforced structure of claim 1 wherein said macroporous thermoplastic film is polypropylene.

5. The reinforced structure of claim 4 wherein said microporous polymer film is polypropylene.

6. The reinforced structure of claim 1 wherein said macroporous thermoplastic film has a total open surface area based upon the entire macroporous film of from about 5 percent to about 25 percent.

References Cited

UNITED STATES PATENTS

| | | | |
|---|---|---|---|
| 3,409,495 | 11/1968 | Rasmussen | 161—402 |
| 3,426,754 | 2/1969 | Bierenbaum | 117—122 P |
| 3,485,705 | 12/1969 | Harmon | 161—402 |

WILLIAM J. VAN BALEN, Primary Examiner

U.S. Cl. X.R.

117—122 P; 156—196, 229; 161—165, 166, 402; 264—210

UNITED STATES PATENT OFFICE
CERTIFICATE OF CORRECTION

Patent No. 3,679,540  Dated July 25, 1972

Inventor(s) Daniel Zimmerman and Stanley Wolfowitz

It is certified that error appears in the above-identified patent and that said Letters Patent are hereby corrected as shown below:

In the specification at Column 5, line 39 delete the following sentence "from about 100,000 to 750,000 preferably about 200,000" and insert this sentence into the specification at Column 4, line 74 immediately following the word "ranging" and in Column 5, line 1 before the word "to."

Signed and sealed this 26th day of December 1972.

(SEAL)
Attest:

EDWARD M. FLETCHER, JR.
Attesting Officer

ROBERT GOTTSCHALK
Commissioner of Patents